United States Patent Office 2,712,002
Patented June 28, 1955

2,712,002

METHOD FOR PURIFYING CRUDE CYANURIC ACID

Lennart A. Lundberg, Stamford, Conn., assignor to American Cyanamid Company, New York, N. Y., a corporation of Maine No Drawing. Application June 11, 1954,
Serial No. 436,254

10 Claims. (Cl. 260—248)

This invention relates to cyanuric acid and more particularly it relates to a novel process for purifying cyanuric acid containing appreciable amounts of insoluble impurities such as ammelide.

Cyanuric acid manufactured by the reaction of dicyandiamide, urea, and ammonium chloride often contains as much as 10–20% ammelide. In the past this cyanuric acid has been purified by a tedious recrystallization process. Due to the low solubility characteristics of both cyanuric acid and ammelide a large number of recrystallization steps have had to be carried out in order to produce a pure cyanuric acid.

It is the primary object of the present invention to supply a process for purifying cyanuric acid which eliminates the necessity for these recrystallization steps. It is a further object to present a process whereby a pure grade of cyanuric acid may be economically produced from a crude cyanuric acid mixture containing insoluble impurities such as ammelide.

These objects have been achieved in a surprisingly effective manner. An aqueous slurry of a mixture of cyanuric acid and impurities is treated with an aldehyde in order to solubilize the cyanuric acid. The solubilized cyanuric acid is then readily separated from the insoluble impurities, as by filtration. The solution of solubilized cyanuric acid is next treated with an alkali in order to form a cyanurate. The cyanurate, which will be in pure form, may be utilized as such directly from the solution in which it was formed or it may readily be converted to insoluble cyanuric acid by the addition of an acid.

The process of the present invention is characterized by ease of handling. The crude cyanuric acid containing from 10 to 20% of impurities such as ammelide may be slurried in any desired amount of water. It is preferred, however, to maintain the solids content of the slurry below about 60% by weight of the total weight of the slurry. Greater concentrations of solids cause unnecessary difficulties in agitating the mass although they can be used. An aldehyde such as acetaldehyde or formaldehyde or one of the formaldehyde-yielding materials such as paraformaldehyde may be then directly added to the aqueous slurry.

An alternative method of treating the impure crude cyanuric acid with the aldehyde is to add a commercial 37% solution of formaldehyde directly to the solid crude cyanuric acid. The commercial solution of formaldehyde contains sufficient water to supply the necessary aqueous medium in which the process of the present invention is carried out. When using this latter method it is again preferred to use only sufficient crude cyanuric acid that the final slurry would contain less than about 60% solids, although greater concentrations can be used if desired. As it happens, the solubilizing reaction between the aldehyde and the cyanuric acid is sufficiently fast that the cyanuric acid begins to go into solution as soon as the formaldehyde solution is added. Thus, with this latter method a 60% slurry is never actually formed.

The solubilizing step may be carried out at any temperature between room temperature and the boiling temperature of the slurry. The solubilizing reaction proceeds with extraordinary rapidity, even in the cold, yet it is often advisable to heat the slurry in order to insure that the reaction has gone to completion. Where dilute slurry concentrations are used, that is on the order of about 5% solids, heating will be unnecessary, although such may be done if desired. As a general rule in the practice of the process of the present invention, the higher the concentration of the slurry the more desirable it is to use an elevated temperature above room temperature. If, however, it is inconvenient to heat the aqueous slurry, then the same results may be accomplished by merely agitating the aldehyde-treated slurry for a longer period of time at room temperature.

The exact mechanism of the reaction during the solubilizing step is not completely understood. It is uncertain as to whether a methylol compound of cyanuric acid forms or whether a bis-compound of cyanuric acid forms. The mechanism plays no role in the process of the present invention. All that is known with certainty is that an aldehyde-cyanuric acid complex of some kind is formed and this complex is extremely soluble.

The amount of aldehyde to be added to a given quantity of crude cyanuric acid may be chosen depending on such factors as the desired speed of reaction and the cost of a convenient alkali to be added later. Generally something more than 1 mol of aldehyde per mol of cyanuric acid is required. However, it is unnecessary to add as much as 3 mols of the aldehyde per mol of cyanuric acid. Somewhere in between these two limits the proper amount of aldehyde may be chosen depending on the desired speed of the reaction. From an economic point of view it is generally preferred to add slightly more than 1 mol of the aldehyde per mol of cyanuric acid. A preferred treatment may consist, for example, of the addition of about 1.2 mols of formaldehyde per mol of cyanuric acid followed by the application of sufficient heat to bring the aqueous slurry to reflux. If, on the other hand, a larger amount of aldehyde is added, for example, 2.8 mols aldehyde per mol cyanuric acid then the solubilizing step may be carried out in the cold simply by agitating for a longer period of time.

After treatment with the aldehyde the slurry now contains all the cyanuric acid in the form of the aldehyde-cyanuric acid complex in solution. The impurities such as ammelide, however, remain insoluble and may readily be separated from the solution by means well known in the art, as by filtration or dewatering. The insoluble impurities may be washed and the washings returned to the aldehyde treatment step. The impurities are disposed of as desired.

The filtered solution now contains substantially nothing except the aldehyde-cyanuric acid complex. The cyanuric acid may readily be recovered by treating the solution with an alkali to destroy the aldehyde-cyanuric acid complex. Such alkalies as ammonia, $KHSO_3$, sodium hydroxide, potassium hydroxide, sodium carbonate, potassium carbonate, and the like may be utilized to destroy the complex and to regenerate the cyanuric acid as a salt thereof. This salt may readily be recovered as such from the solution as by evaporation and crystallization, or the salt solution may be treated with any convenient acid as hydrochloric acid, sulfuric acid, in order to regenerate the insoluble cyanuric acid. If this latter method is used, the cyanuric acid may then be removed from the solution as by filtration, washed, and dried. Cyanuric acid so treated has a purity of greater than about 99%. Sufficient alkali should be added to give the solution an alkaline reaction. The pH should be greater than about 8. Under these conditions, a portion of the cyanuric acid salt may crystallize out without any further treatment. The aldehyde, if it is formaldehyde, appears as a very soluble formate and as formaldehyde itself; this formaldehyde will not react with the cyanuric acid salt. If acetaldehyde has been used as a solubilizing agent, then the acetaldehyde either undergoes an aldol condensation to form soluble products or it forms soluble acetates. In either case, the cyanuric acid salt may be readily recovered from solution without contamination by any other products.

Should it be desired, the cyanuric acid salt either in the form of a solid pure salt or in solution may be treated with an acid, preferably a mineral acid, in order to throw down substantially pure cyanuric acid itself. This treatment is most conveniently carried out at room temperature. The cyanuric acid may be separated from the solution as by filtration, washed, and dried.

The following examples illustrate without limiting the process of the present invention. All parts are by weight unless otherwise stated.

*Example 1*

To 9.85 parts (0.0763 mols) crude cyanuric acid is added 18.68 parts (0.2289 mols) 37% commercial formaldehyde solution. A slurry is formed which clears almost immediately on heating leaving a slight precipitate behind. The slurry is heated to the reflux temperature, and cooled. The insoluble material is removed by filtration; this insoluble material is found to consist of ammelide.

To the clear solution is added 16 parts (0.40 mol) 10% sodium hydroxide solution. A precipitate appears. On filtration the precipitate is found to consist of monosodium cyanurate having a purity of greater than 99%. The mother liquor is evaporated to half its volume and cooled and filtered. A total of 9.1 parts monosodium cyanurate is recovered all of which has a purity greater than 99.0%.

*Example 2*

A crude cyanuric acid mixture containing 92% cyanuric acid, 7.8% ammelide, and traces of ammeline is slurried in water to form 100 parts of slurry containing 40% solids. To the slurry is added 0.3 mols acetaldehyde and the mixture is heated to reflux and maintained at reflux for 1 hour. The solution is then filtered hot and cooled. To the cooled solution is added aqueous ammonium hydroxide solution in amount equivalent to 0.31 mols ammonia. The mixture is agitated and evaporated to about ⅓ its volume. A 10% solution of sulfuric acid is added in amount equivalent to 0.35 mols. The mixture is then agitated and filtered to remove the cyanuric acid. 35 parts of cyanuric acid having a purity greater than 99% is recovered for a yield of 95% based on the amount of pure cyanuric acid in the original crude mixture.

*Example 3*

To 100 parts of the crude cyanuric acid of Example 2 is added 66 parts commercial 37% formaldehyde. The mixture is heated to reflux, cooled and filtered. To the mixture is then added ammonium hydroxide equivalent to 0.85 mols ammonia. The solution is agitated and sufficient sulfuric acid is added to produce a pH of 5. The precipitate when filtered and dried is found to consist of 83.4 parts cyanuric acid having a purity greater than 99% for a yield of 91% based on the crude cyanuric acid in the starting mixture.

I claim:

1. The method of purifying a mixture of cyanuric acid and impurities which comprises treating an aqueous slurry of said mixture with an aldehyde selected from the group consisting of formaldehyde and acetaldehyde to solubilize cyanuric acid, separating said solubilized cyanuric acid from insoluble impurities, and treating said solubilized cyanuric acid with an alkali to form a cyanurate.

2. A process according to claim 1 carried out at a temperature in the range of from about room temperature to about the reflux temperature at atmospheric pressure.

3. The method of purifying a mixture of cyanuric acid and impurities which comprises treating an aqueous slurry of crude cyanuric acid with an amount of formaldehyde in the range of about 1–3 mols formaldehyde per mol cyanuric acid, separating insoluble impurities from soluble formaldehyde-cyanuric acid complex, and treating said complex with an alkali to form a cyanurate.

4. The method according to claim 3 wherein said alkali is ammonia.

5. The method according to claim 3 wherein said alkali is sodium hydroxide.

6. The method of purifying crude cyanuric acid which comprises slurrying crude cyanuric acid in water, treating said slurry with formaldehyde in an amount in the range of about 1–3 mols formaldehyde per mol cyanuric acid to a mixture of cyanuric acid and impurities mixed therewith to solubilize cyanuric acid by forming a soluble formaldehyde-cyanuric acid complex, separating solution containing said complex from insoluble impurities, destroying said complex by the addition of an alkali, precipitating cyanuric acid by the addition of an acid, and recovering cyanuric acid therefrom.

7. The method according to claim 6 wherein said alkali is ammonia.

8. The method of separating cyanuric acid from impurities mixed therewith which comprises adding a formaldehyde solution in amount in the range of about 1–3 mols formaldehyde per mol cyanuric acid to a mixture of cyanuric acid and impurities mixed therewith to solubilize cyanuric acid by forming a soluble formaldehyde-cyanuric acid complex, separating solution containing said complex from insoluble impurities, destroying said complex by the addition of an alkali, precipitating cyanuric acid by the addition of an acid, and recovering cyanuric acid therefrom.

9. The process according to claim 8 wherein said alkali is ammonia.

10. The process according to claim 8 wherein said alkali is ammonia and said acid is sulfuric acid.

No references cited.